June 30, 1953   W. D. MOSLEY   2,643,891
TRAILER HITCH STRUCTURE
Filed Jan. 25, 1952   2 Sheets-Sheet 1
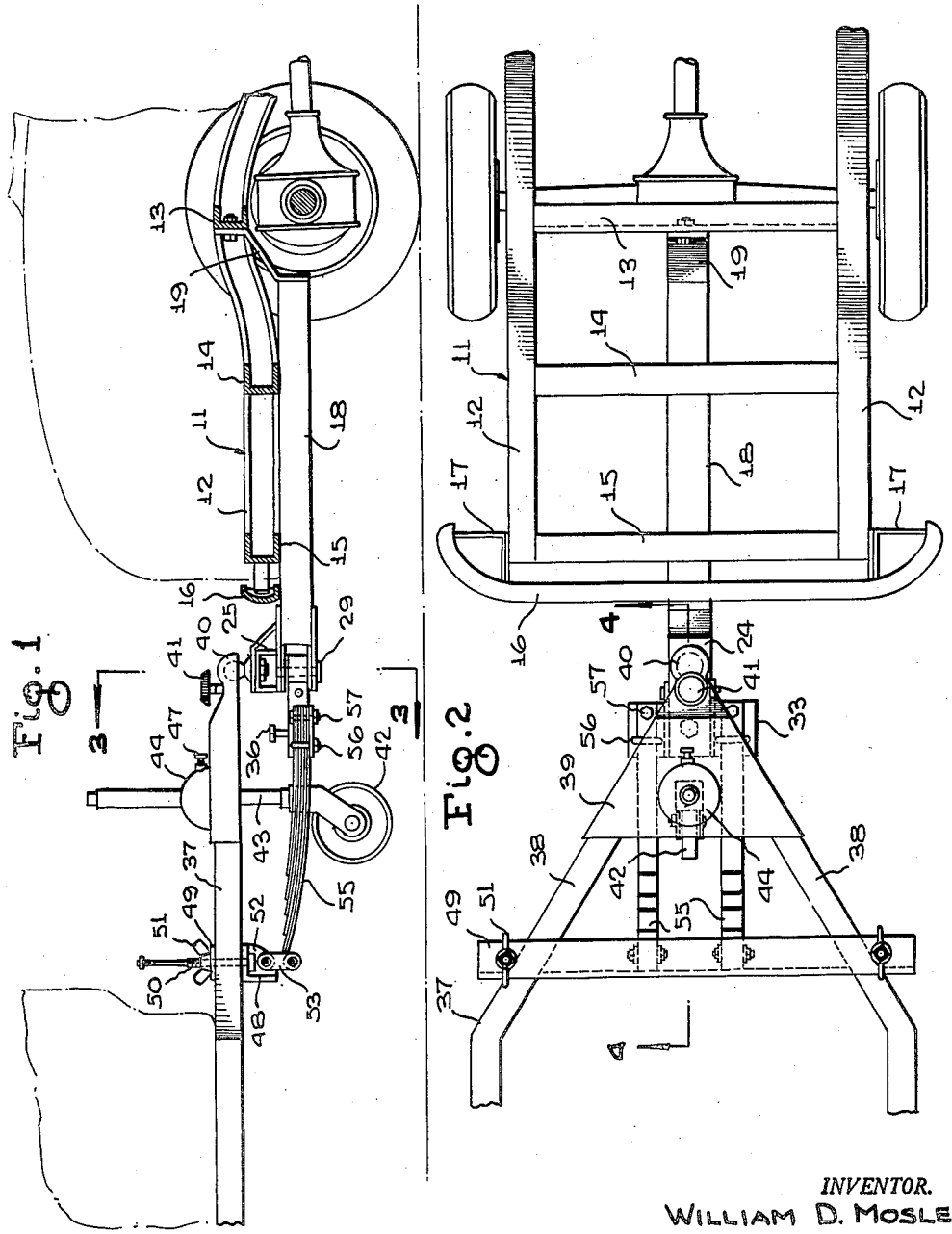
INVENTOR.
WILLIAM D. MOSLEY
BY
McMorrow, Berman & Davidson
ATTORNEYS June 30, 1953 W. D. MOSLEY 2,643,891
TRAILER HITCH STRUCTURE
Filed Jan. 25, 1952 2 Sheets-Sheet 2
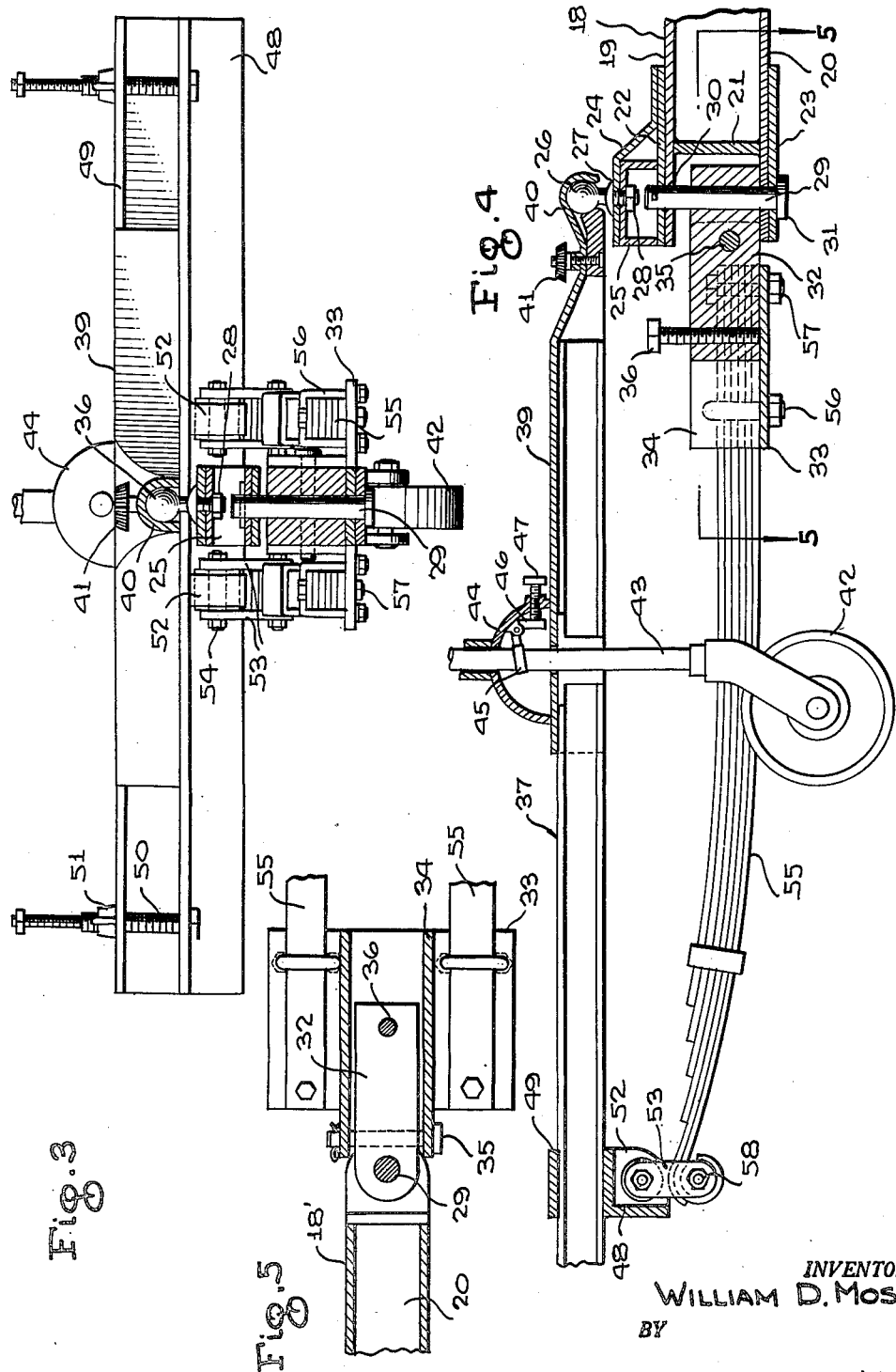
INVENTOR.
WILLIAM D. MOSLEY
BY
McMorrow, Berman & Davidson
ATTORNEYS Patented June 30, 1953

2,643,891

UNITED STATES PATENT OFFICE 2,643,891

TRAILER HITCH STRUCTURE

William D. Mosley, El Paso, Tex.

Application January 25, 1952, Serial No. 268,199

2 Claims. (Cl. 280—33.9)

This invention relates to trailer hitch structure, and more particularly to an improved means for connecting a trailer to a motor vehicle.

The main object of the invention is to provide a novel and improved trailer hitch structure for connecting a trailer to an automobile, the improved structure involving simple components, being easy to install, and serving to transfer the weight of the trailer to the forward portion of the frame of the automobile, thereby allowing the automobile to ride in a substantially level condition.

A further object of the invention is to provide an improved trailer hitch structure which involves relatively inexpensive parts, which is sturdy in construction, and which resiliently supports the rear portion of the automobile, preventing excessive impact on the automobile frame when passing over rough spots and obstructions in the road, the improved trailer hitch structure being adjustable for different weights and sizes of trailers, and further being adjustable for conditions wherein the rear portion of the automobile is heavily loaded, the improved trailer hitch structure being provided with means for elevating and supporting the rear portion of the automobile and for transferring the weight of the trailer to the forward portion of the automobile, allowing the automobile and trailer to ride in substantially level positions.

Further objects and advantages of the invention will become apparent from the following description and claims, and from the accompanying drawings, wherein:

Figure 1 is a side elevational view of the rear portion of an automobile frame having secured thereto an improved trailer hitch structure according to the present invention.

Figure 2 is a top view of the rear portion of the automobile frame and the trailer hitch structure, illustrated in Figure 1.

Figure 3 is an enlarged vertical transverse cross sectional view taken on the line 3—3 of Figure 1.

Figure 4 is an enlarged longitudinal vertical cross sectional view taken on the line 4—4 of Figure 2.

Figure 5 is a cross sectional detail view taken on the line 5—5 of Figure 4.

Referring to the drawings, 11 designates the frame of an automobile, said frame being conventional in construction and including the longitudinal side members 12, 12 and the respective transverse cross members 13, 14 and 15, as shown in Figures 1 and 2.

The rear bumper 16 is connected to the end corner portions of the frame by conventional bracket members 17, 17.

Secured to the bottom portions of the transverse members 14 and 15 midway between and extending parallel to the side frame elements 12, 12 is the longitudinally extending drawbar member 18, the forward end of said drawbar member being connected to the intermediate portion of the cross member 13 by a rigid bracket 19. The longitudinal drawbar member is, of course, rigidly connected to the bottom surfaces of the transverse bar members 14 and 15 in any suitable manner, as by welding or the like. As shown in Figure 1, the drawbar 18 extends beneath the bumper 16 and projects rearwardly from the frame 11.

As shown in Figure 4, the drawbar 18 is of hollow construction and includes the top walls 19 and 20 which project beyond the transverse end wall 21 and have secured thereto the respective top and bottom reinforcing plates 22 and 23. Welded to the top plate 22 is the offset bracket 24, and welded between the upper arm of bracket 24 and the plate member 22 is the transversely extending, inverted channel member 25. Designated at 26 is a conventional trailer hitch ball which is secured on the top portion of the offset bracket 24, said hitch ball being provided with a threaded shank 27 which extends through the web of the channel 25 and which is tightly secured thereto by a nut 28, as shown in Figure 4.

Designated at 29 is a vertical king pin which extends through the rear end portions of the top walls 19 and 20, as well as through the plate members 22 and 23, the king pin 29 being axially aligned with the hitch ball 26, as shown in Figure 4. The king pin is secured in the position shown in Figure 4 by a transverse locking pin 30 extending through the top end of the shank of the king pin, the lower end of the king pin being provided with the head 31. Designated at 32 is a rectangular block or tongue which is received between the ends of the top and bottom wall members 19 and 20 of the drawbar 18, the tongue being pivotally secured to the drawbar by the king pin 29, as shown in Figure 4.

Designated at 33 is a horizontal, transversely extending rectangular plate member formed with the spaced parallel upstanding longitudinal flanges 34, 34 between which the tongue member 32 is received, as shown in Figure 5, said flanges projecting beyond the left margin of the plate member 33, as viewed in Figure 5, and being pivotally connected to the tongue 32 by a transversely extending pin 35. From Figure 4 it will be clearly apparent that the tongue member 32 is free to pivot in a horizontal plane around the king pin 29 but is substantially rigidly locked to the drawbar 18 for vertical rotation thereof. The tongue member 32 may, however, rotate around the transverse pin member 35 relative to the plate member 33. Threaded through the left end portion of the tongue member 32, as viewed in Figure 4, is the adjustable stop screw 36 which may be rotated so as to adjust the tongue member 32 to a desired angular position around the axis of the transverse pin 35 relative to the plate member 33 for a purpose subsequently to be explained.

Designated at 37 is a conventional trailer drawbar having the converging tongue beams 38, 38 which are connected by a triangular plate member 39 at their joining end portions. The end of the drawbar 37 is provided with the releasable socket 40 adapted to receive the ball 26, as shown in Figure 4, and provided with conventional locking means 41 for preventing the ball member 26 from being removed from the socket member 40 after the trailer has been connected to the hitch structure carrying ball 26. The trailer drawbar structure 37 also includes the dolly wheel 42 which is carried on the vertically adjustable shaft member 43 which extends through conventional clamping means 44 for securing the shaft 43 either in a lowered position or in a raised position. The dolly wheel 42 is shown secured in a raised position in Figure 1, wherein the drawbar structure 37 is shown connected to the trailer hitch. When the trailer is disconnected from the automobile, the dolly wheel 42 is lowered and is arranged to support the forward portion of the trailer. As shown in Figure 4, the anchoring structure 44 for the dolly wheel shaft 43 includes a pivoted clamping lever 45 having an arm 46 engaged by a locking screw 47. By tightening the screw 47, the clamping arm of the lever 45 may be locked in tight clamping engagement with the shaft 43, thus securing the dolly wheel 42 in a fixed position of elevation relative to the remainder of the trailer drawbar structure 37.

Designated at 48 is a transversely extending angle bar which may be arranged transversely beneath the convergent drawbar elements 38, 38 in the manner shown in Figures 3 and 4, and designated at 49 is a transversely extending flat bar which is arranged over the drawbar elements 38, 38 parallel to the angle bar 48. Extending through the end portions of the horizontal flange of the angle bar 48 and the flat bar 49 are the clamping bolts 50, 50 which are provided with the wing nuts 51 for tightly clamping the transverse bars 48 and 49 to the convergent trailer drawbar members 38, 38 adjacent the rear ends of the convergent bars 38, 38, as shown in Figures 1 and 2. Rigidly secured to the intermediate portion of the angle bar 48 are the respective lugs 52, 52, and pivotally connected to each of the lugs 52 are a pair of depending link bars 53, 53, said link bars being pivotally secured to the lugs 52 by transverse bolts 54, one link bar being disposed on each side of a lug. As shown in Figure 2, the lugs 52, 52 are spaced symmetrically on opposite sides of the longitudinal central plane of the trailer. Designated at 55, 55 are respective cantilever leaf spring units which are rigidly connected at their thick ends to the respective opposite sides of the transversely extending plate member 33, as by the U-bolts 26 and single bolts 57 arranged as shown in Figures 2 and 4. The forward end of each leaf spring unit 55 is received between a pair of links 53, 53 and pivotally connected thereto by a transverse bolt 58, the end portions of the lowermost leaves of the spring units being curved to define sleeves through which the bolt 58 and suitable spacer rollers mounted thereon may be received. It will therefore be seen that the leaf springs 55 are rigidly connected at their thick ends to the plate member 33 and are pivotally connected at their flexible, relatively thin ends to the link bars 53, which are in turn pivotally connected to the transverse angle bar 48.

In using the trailer hitch structure, it will be readily understood that the drawbar member 18 is first rigidly secured to the frame of the automobile, in the manner above described. The tongue member 32 may be normally detached from the drawbar 18 by removing the king pin 29. However, when it is desired to connect a trailer to the automobile, the tongue member 32 is pivotally connected to the drawbar 18 by the king pin 29 as shown in Figures 3 and 4. The transverse angle bar 48 is arranged beneath the convergent bar elements 38, 38 of the trailer drawbar structure and the rear end of the automobile is jacked up to bring the angle bar 48 into contact with the bottom surfaces of said trailer drawbar elements 38, 38. The bar 49 is then placed over the angle bar 48 in contact with the top surfaces of the trailer drawbar elements 38, 38 and the bar members 49 and 48 are clamped to the trailer drawbar members 38, 38 by means of the bolts 50 and wing nuts 51. Prior to this, the ball 26 has been received in the socket 40 and secured thereto in the usual manner. The rear portion of the motor vehicle may then be lowered by means of the jack employed to elevate same, and the jack may be removed. The dolly wheel 42 may be elevated and locked in elevated position, whereby the trailer is supported by the rear portion of the automobile through the trailer hitch connection.

It will be seen that the forward portion of the trailer is supported by the drawbar 18 through the resilient connection defined by the cantilever spring units 55, 55. Should the automobile be heavily loaded at its rear portion, whereby the frame 11 is tilted downwardly at the rear end of the automobile, the rear portion of the frame 11 and drawbar 18 may be elevated by rotating the screw 36 to move it downwardly and to cause the tongue member 32 to be rotated around the transverse pin 35 in a clockwise direction, as viewed in Figure 4. This elevates the drawbar 18 relative to the plate member 33, as above explained, and allows the automobile frame to be adjusted to a more nearly horizontal position and to thus improve the riding qualities of the automobile and trailer, as well as cushioning the impact produced by riding over rough spots or obstacles on the road.

While a specific embodiment of an improved hitch structure for connecting a trailer to an automobile has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A hitch structure for connecting a trailer to an automobile comprising a longitudinal drawbar rigidly connected to the frame of the automobile, a ball member mounted on said drawbar, a tongue member pivoted to said drawbar beneath said ball member for horizontal rotation around the vertical axis of the ball member, bracket means hingedly secured to said tongue member for rotation around a horizontal transverse axis relative to said tongue member, a transversely extending bar member adapted to be secured to the trailer drawbar, adjustable abutment means arranged to elevate the tongue member relative to said bracket means, and a cantilever spring connected rigidly at one end to said bracket means and pivotally connected at its other end to said bar member.

2. A hitch structure for connecting a trailer to an automobile comprising a longitudinal drawbar rigidly connected to the frame of the automobile, a ball member mounted on said drawbar, a tongue member pivoted to said drawbar beneath said ball member for horizontal rotation around the vertical axis of the ball member, bracket means hingedly secured to said tongue member for rotation around a horizontal transverse axis relative to said tongue member, a set screw threaded through said tongue member and being engageable with said bracket means, said set screw being arranged to elevate the tongue member relative to said bracket means, a transversely extending bar member adapted to be secured to the trailer drawbar, a cantilever spring connected to said bracket means and extending adjacent said bar member, and means pivotally connecting the end of said spring to said bar member.

WILLIAM D. MOSLEY.

References Cited in the file of this patent

UNITED STATES PATENTS

| Number | Name | Date |
|---|---|---|
| 2,238,095 | Almcrantz | Apr. 15, 1941 |
| 2,453,941 | Smit | Nov. 16, 1948 |
| 2,507,189 | Arehart | May 9, 1950 |
| 2,512,142 | Chisholm | June 20, 1950 |
| 2,517,047 | Spitler | Aug. 1, 1950 |
| 2,523,210 | Hedgepeth | Sept. 19, 1950 |